United States Patent
Roach

(10) Patent No.: US 12,405,747 B2
(45) Date of Patent: Sep. 2, 2025

(54) DYNAMIC PAGE FIX OPTIMIZATION FOR DATABASE OBJECTS

(71) Applicant: BMC Software, Inc., Houston, TX (US)

(72) Inventor: Donnell W. Roach, Houston, TX (US)

(73) Assignee: BMC Software, Inc., Houston, TX (US)

( * ) Notice: Subject to any disclaimer, the term of this patent is extended or adjusted under 35 U.S.C. 154(b) by 88 days.

(21) Appl. No.: 18/171,104

(22) Filed: Feb. 17, 2023

(65) Prior Publication Data
US 2024/0281168 A1    Aug. 22, 2024

(51) Int. Cl.
*G06F 3/06* (2006.01)
*G06F 12/08* (2016.01)

(52) U.S. Cl.
CPC .......... *G06F 3/0656* (2013.01); *G06F 3/0613* (2013.01); *G06F 3/0683* (2013.01); *G06F 12/08* (2013.01); *G06F 2212/254* (2013.01)

(58) Field of Classification Search
CPC .... G06F 3/0683; G06F 3/0656; G06F 3/0613; G06F 12/08; G06F 9/544; G06F 9/5022; G06F 2212/657; G06F 2212/152; G06F 2209/5011; G06F 3/061; G06F 11/3409; G06F 3/0679; G06F 12/0246
USPC .......................................... 711/203, 170, 165
See application file for complete search history.

(56) References Cited

U.S. PATENT DOCUMENTS

| | | | |
|---|---|---|---|
| 8,788,527 B1* | 7/2014 | Nadel | G06F 16/217 707/791 |
| 2007/0176938 A1* | 8/2007 | Nagori | H04N 19/433 375/E7.102 |
| 2023/0168952 A1* | 6/2023 | Li | G06F 16/24552 707/736 |

OTHER PUBLICATIONS

IBM, "5655-W35 IBM DB2 Buffer Pool Analyzer for z/OS, V5.3" available online at <https://www.ibm.com/common/ssi/ShowDoc.wss?docURL=/common/ssi/rep_sm/5/877/ENUS5655-W35/index.html>, Feb. 6, 2018, 5 pages.

IBM, "Assigning database objects to buffer pools," available online at <https://www.ibm.com/docs/en/db2-for-zos/12?topic=pools-assigning-database-objects-buffer>, Jan. 25, 2023, 3 pages.

IBM, "Fixing a bugger pool in real storage," available online at <https://www.ibm.com/docs/en/db2-for-zos/12?topic=pools-fixing-buffer-pool-in-real-storage>, Jan. 25, 2023, 2 pages.

(Continued)

*Primary Examiner* — Jared I Rutz
*Assistant Examiner* — Edward Waddy, Jr.
(74) *Attorney, Agent, or Firm* — Brake Hughes Bellermann LLP

(57) ABSTRACT

A main memory of at least one computing device may be monitored to determine available main memory for a fixed buffer pool storing a first set of data objects accessible by an application. A virtual buffer pool stored in a secondary memory of the at least one computing device and storing a second set of data objects accessible by the application may be monitored. Object performance profiles that include an object performance profile for each data object of the second set of data objects may be generated. A transfer trigger for selecting a candidate transfer object from the second set of data objects for transfer to the main memory may be determined, based on the object performance profiles. The candidate transfer object may be transferred from the sec- (Continued)

ondary memory to the fixed buffer pool to be included in the first set of data objects, in response to the transfer trigger.

20 Claims, 11 Drawing Sheets

(56) References Cited

OTHER PUBLICATIONS

IBM, "Tuning database buffer pools," available online at <https://www.ibm.com/docs/en/db2-for-zos/12?topic=performance-tuning-database-buffer-pools>, Jan. 25, 2023, 4 pages.
BMC, "Documentation BMC AMI Pool Advisor for Db2 13.1," available online at <https://docs.bmc.com/docs/bspfd131/getting-started-1059395467.html>, Oct. 29, 2020, 12 pages.

* cited by examiner

| Configuration optimization trigger events | User configurable | Default |
|---|---|---|
| Date/Time | Yes | No |
| Predictive relative I/O cost savings | Yes | Yes |
| Predictive peak object activity intervals | No | Yes |

FIG. 12

| Control | User configurable | Default | Type |
|---|---|---|---|
| Maximum real storage for optimization pools | Yes | Yes | Ceiling |
| Two phase optimization | Yes | Yes | Functional |
| Mode of operation (dedicated/shared) | Yes | Yes | Functional |
| Object locking (shared mode only) | Yes | Yes | Functional |

FIG. 13

DYNAMIC PAGE FIX OPTIMIZATION FOR DATABASE OBJECTS

TECHNICAL FIELD

This description relates to database management.

BACKGROUND

Computing resources are finite, and often must be shared, e.g., by multiple applications and/or multiple users. Many techniques have been developed for optimizing use of such shared, finite resources.

For example, multiple types of memories may be used, each having various characteristics. For example, an application may be executed using a combination of main memory and virtual memory. The main memory may be used to provide fast/low-latency access to high-priority application data, while the virtual memory may be implemented using separate, slower disk storage in which lower-priority application data is stored. Such approaches attempt to balance factors such as access speed, available quantities of the different types of memory, and an amount of work (e.g., processing cycles) required to be performed by a processor to interact with the different types of memories.

It is often difficult, however, to strike such a balance. For example, it may be difficult to define a priority level(s) of different types of application data, particularly when requirements of the relevant application(s) change relatively frequently, and/or when a quantity of the application data is large. When available memories of computing resources are used sub-optimally, relevant applications may underperform, processing resources may be strained, and/or other consumers of the shared computing resources may experience adverse effects.

SUMMARY

According to some general aspects, a computer program product may be tangibly embodied on a non-transitory computer-readable storage medium and may include instructions. When executed by at least one computing device, the instructions may be configured to cause the at least one computing device to monitor a main memory of the at least one computing device to determine available main memory for a fixed buffer pool storing a first set of data objects accessible by an application, and monitor a virtual buffer pool stored in a secondary memory of the at least one computing device and storing a second set of data objects accessible by the application. When executed by at least one computing device, the instructions may be configured to cause the at least one computing device to generate object performance profiles that include an object performance profile for each data object of the second set of data objects, determine a transfer trigger for selecting a candidate transfer object from the second set of data objects for transfer to the main memory, based on the object performance profiles, and transfer the candidate transfer object from the secondary memory to the fixed buffer pool to be included in the first set of data objects, in response to the transfer trigger.

According to other general aspects, a computer-implemented method may perform the instructions of the computer program product. According to other general aspects, a system may include at least one memory, including instructions, and at least one processor that is operably coupled to the at least one memory and that is arranged and configured to execute instructions that, when executed, cause the at least one processor to perform the instructions of the computer program product and/or the operations of the computer-implemented method.

The details of one or more implementations are set forth in the accompanying drawings and the description below. Other features will be apparent from the description and drawings, and from the claims.

BRIEF DESCRIPTION OF THE DRAWINGS

FIG. 12 is a table illustrating examples of configuration optimization trigger events.

FIG. 13 is a table illustrating examples of operational controls for implementing example embodiments of the system of FIG. 1.

DETAILED DESCRIPTION

Described systems and techniques enable, for example, optimized use of shared computing resources, including both processing and memory resources. Consequently, users of the computing resources may experience fewer delays and better experiences with applications executing with the computing resources, while providers of the computing resources may experience greater customer satisfaction and more efficient and cost-effective use of the computing resources.

Figure 1:
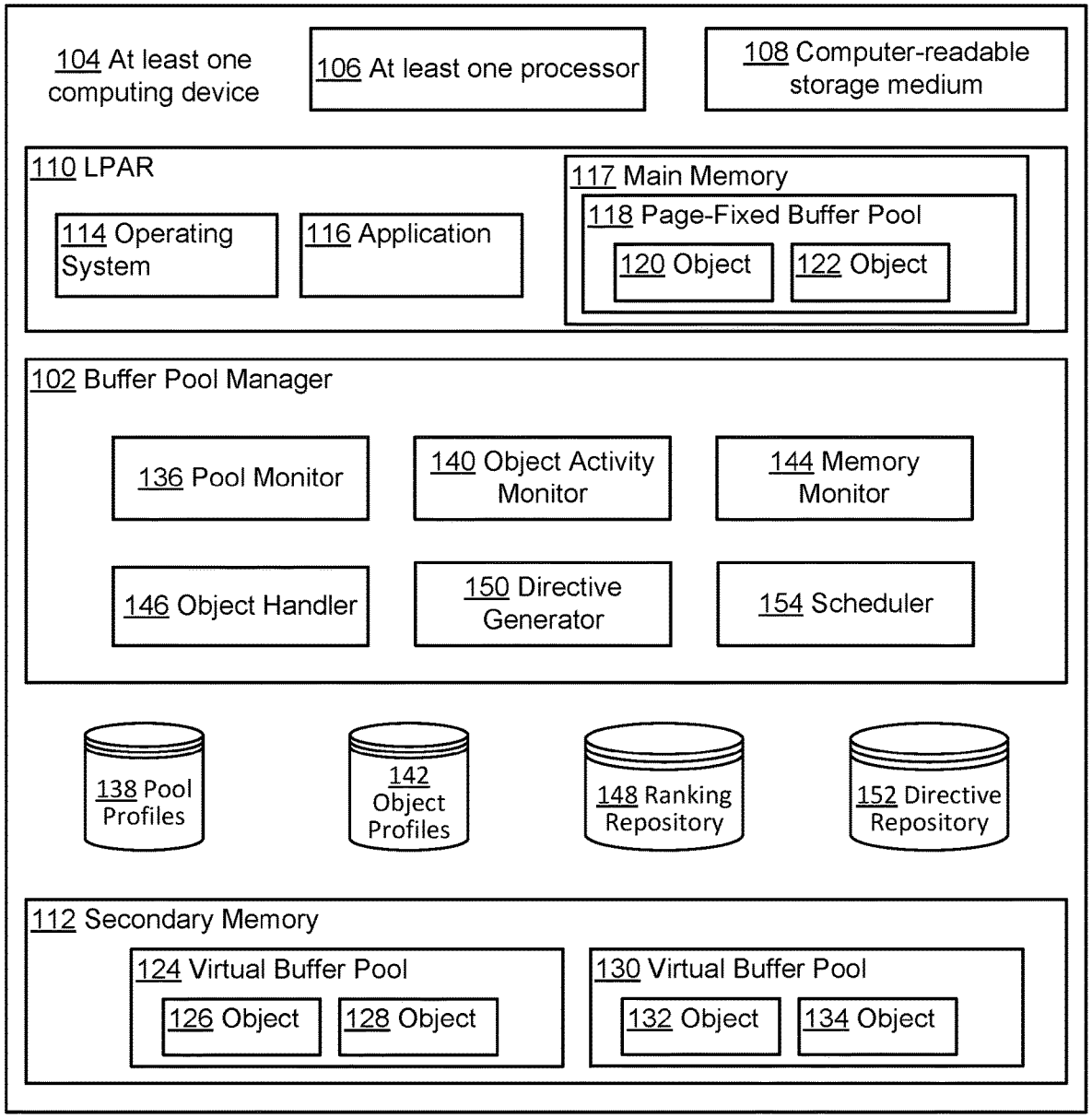
FIG. 1 is a block diagram of a system for dynamic page fix optimization for database objects.

FIG. 1 is a block diagram of a system for dynamic page fix optimization for database objects. In the example of FIG. 1, a buffer pool manager 102 running on at least one computing device 104 may be configured to optimize an efficiency and use of at least one processor 106 and one or memories represented by computer-readable storage medium 108.

For example, the at least one computer 104 may be configured to provide one or more logical partitions (LPARs), represented by LPAR 110. For example, the at least one processor 106 and the computer-readable storage medium 108 may represent, or include, multiple Central Processing Units (CPUs) and memories, which are divided to create independent, parallel computing environments represented by the LPAR 110. For example, such LPARs may thus be executed using separate and/or different operating systems, and may therefore execute associated applications independently of one another, among other known features and advantages.

To provide its intended functions, the LPAR 110 may be provided with access to a defined quantity of main, core, or primary memory of the at least one computing device 104, e.g., to a particular type and quantity of one or more high-speed, low-latency memories represented by the computer-readable storage medium 108. For example, the LPAR 110 may be provided with access to a random access memory (RAM) that is physically proximate to, or otherwise highly accessible by, the LPAR 110.

Use of such main memory resources may thus conserve use of resources of the at least one processor 106. However, such main memory resources are often very limited, and, e.g., may be shared among multiple LPARs, including the LPAR 110.

As described in detail, below, the buffer pool manager 102 may be configured to facilitate use of such main memory resources by the LPAR 110 (and possibly other LPARs, not shown in FIG. 1 for the sake of simplicity), through the use of secondary memory 112. For example, as described in detail below, the secondary memory 112 may represent disk-based storage, or any type of storage that is relatively slower but more plentiful (and less expensive) than the main memory resources referenced above, and which therefore typically requires more processing resources (e.g., CPU cycles) of the at least one processor 106.

For example, as shown, the LPAR 110 may execute an operating system (OS) 114 used to provide an application 116. In specific examples provided herein, the operating system 114 may represent or include an implementation of the z/OS® operating system of IBM. In other examples, the OS 114 may include a Linux or Windows environment, and other operating systems and implementations may be used, as well.

Similarly, the application 116 may represent a database system, such as IBM's Db2® enterprise data server or database engine, which manages desired types and quantities of data (and associated data management and access functionality) on behalf of customers. Many other types of applications may be included, as well.

For example, the application 116 may represent any application executing in a private network of an enterprise, or a mainframe computing environment. For example, the application 116 may represent an application governing a plurality of internet of things devices (IoT), which may be used to monitor environmental conditions and report on corresponding status information. The application 116 may relate to a healthcare setting; an operation of a vehicle, a manufacturing equipment, or a telecommunications environment; or many other industrial settings (including the oil, gas, or energy industry). The application 116 may relate to a banking environment, and may be used, e.g., to process financial transactions.

Of course, the above examples are non-limiting, and are provided merely for the purpose of explanation of operations of the buffer pool manager 102 and related operations. In various other embodiments, the LPAR 110 may be replaced by a virtual machine (VM), or may be omitted entirely (i.e., the at least one computing device 104 may directly provide the OS 114 and the application 116). Similarly, various combinations and implementations of the OS 114 and/or the application 116 may be used that are not described here for the sake of conciseness.

In the example of FIG. 1, the application 116 may require access to data in order to provide intended functions of the application 116. For example, the application 116 may represent a database application, as referenced above, and may be used to access previously stored data or data stored in other databases. For example, such data may be stored in a relational database, and the application 116 may issue queries against the relational database.

As described herein, storing such application data using main memory 117 (e.g., using a dedicated portion of a main memory represented by the computer-readable storage medium 108) may provide fast access to the application data by the application 116. As also described, main memory 117 is limited and may be required to be shared among multiple LPARs and/or applications. The buffer pool manager 102 is also configured to enable storage of the application data using the secondary memory 112, as well.

In more detailed examples, the buffer pool manager 102 may provide a caching scheme in which various data objects are stored and transferred together in units of pages of objects. In other words, a page may refer to a unit of data management for described buffer pools. Example pages and page sizes are not illustrated explicitly in the simplified example of FIG. 1, but are described in more detail, below, e.g., with respect to FIGS. 5 and 6.

The LPAR 110 is assigned one or more page-fixed buffer pools, represented by a page-fixed buffer pool 118, which may also be referred to as a fixed buffer pool. For example, the page-fixed buffer pool 118 refers to one or more pages of data objects that have been pinned or otherwise fixed within the main memory 117 of the LPAR 110. The page-fixed buffer pool 118 may thus be used to maintain application data of the application 116, represented in FIG. 1 by an object 120 and an object 122, within the main memory 117 and easily accessible by the application 116.

The buffer pool manager 102 may be further configured to utilize the secondary memory 112 to provide virtual buffer pool 124 (storing object 126 and object 128) and virtual buffer pool 130 (storing object 132 and object 134). Like the page-fixed buffer pool 118, the virtual buffer pools 124, 130 may be used to store application data of the application 116. Unlike the page-fixed buffer pool 118, the virtual buffer pools 124, 130 may be transferred between the main memory 117 and the secondary memory 112.

Thus, the buffer pool manager 102 may be configured to provide the page-fixed buffer pool 118 in the main memory 117, which is allocated for high-speed, high-priority data access by the application 116. Meanwhile, the virtual buffer pools 124, 130 may be used to store application data that may be accessed in a relatively low-speed, low-priority manner.

Accordingly, the buffer pool manager 102 may ensure the type of optimized and efficient access to application data described herein. For example, as just referenced, it is possible to transfer a virtual buffer pool, such as the virtual buffer pool 130, between the secondary memory 112 and the main memory 117. Such transfers may be useful, e.g., when the virtual buffer pool 130 is found to have high levels of access activity with respect to the application 116, so that efficiencies may be gained by executing such access activity from the main memory 117, rather than from the secondary memory 112.

However, transfers of entire virtual buffer pools between the secondary memory 112 and the main memory 117 may have limited utility. For example, unlike the simplified example of FIG. 1, typical virtual buffer pools may include large numbers of data objects (e.g., tens, hundreds, or thousands of objects). In many cases, only a relatively small number of these data objects may have high levels of access activity.

Further, relative levels of access activity (by a virtual buffer pool as a whole, or by individual objects thereof) may change over time. It may be difficult to execute associated transfers between the main memory 117 and the secondary memory 112 in a timely fashion, in response to such changes. Moreover, even if such transfers are executed in a timely fashion, a cost of doing (if performed too frequently) may outweigh the benefits of the transfers.

Consequently, in described techniques, the buffer pool manager 102 may be configured to transfer object-level data (e.g., individual objects, or groups of objects) between the main memory 117 and the secondary memory 112. For example, by determining the best objects to occupy page-fixed buffer pool 118, the buffer pool manager 102 optimizes the CPU-savings advantages that fixed-page buffer pools were designed to provide.

As described in detail, below, the buffer pool manager 102 may be configured to identify individual objects within the virtual buffer pools 124, 130 that would be best candidates for page-fixed buffer pool 118, and further configured to automatically rotate the less active objects out of the page-fixed areas (real storage, main memory) to the virtual buffer pools 124, 130, while rotating in more active objects. In accordance with advantages of techniques described herein, such identifying and transferring activities may be performed without user intervention, providing an automatic process that saves administrators, systems programmers, and other users from being required to perform manual computations to determine which objects would best utilize the resources of the main memory 117 dedicated on the LPAR 110, while also reducing or eliminating manual activity required to move objects in and out of buffer pools as the objects' access activity increases/decreases over time. The resulting movement of objects in and out of page-fixed buffer pool(s) 118 is designed to optimize the use of such page-fixed buffer pools to reach or approach the maximum CPU savings ascribed to page fixing.

Further, the buffer pool manager 102 may be configured to determine when a size of the page-fixed buffer pool 118 may be reduced, e.g., based on the number of objects that have been assigned to and/or removed therefrom. Such dynamic size adjustments help balance the physical storage resources on the LPAR 110, so that a minimum amount of main memory 117 may be used as required for page-fixed buffer pools (based on the objects' access activity).

In the present description, the term buffer pool, buffer, or cache, or similar terms, should be understood to refer to designated memory types or amounts used in memory management techniques to provide optimized and efficient access to application data. In specific examples provided herein, a designated number of buffer pools may be assigned, e.g., to an application such as the application 116, and the buffer pools may be configured to have one or more designated page sizes. Example page sizes and page size distributions of such buffer pools are provided below, e.g., with respect to FIGS. 5 and 6.

The various objects (e.g., objects 120, 122, 126, 128, 132, 134) may refer to any group of application data that might be used by the application 116. In specific examples provided herein, in which the application 116 represents a database application, the various objects 120, 122, 126, 128, 132, 134 may each represent, e.g., a table(s) of the database application, a tablespace for such table(s), an index for accessing one or more database table(s), or an index space for such index(es).

During various use case scenarios of the application 116, as referenced above, such objects may have varying levels of access activity with respect to the application 116. For example, the object 120 may represent a table that is queried many times within a particular time window, while the object 128 may represent a table that is rarely queried during the same time window. More generally, the term access activity as used herein should be understood to represent any operation(s) used to read, write, add, modify, or delete data with respect to any one of the various objects 120, 122, 126, 128, 132, 134 (or corresponding buffer pools). Access activity may be captured differently depending on, e.g., a type of application, object, buffer pool, or memory/storage being used. Moreover, multiple metrics may be used to detect, determine, characterize, measure, or infer such access activities.

For example, input/output (I/O) intensity may refer to a characterization of access activity based on input and output operations of an object(s) within the virtual buffer pools 124, 130 of the secondary memory 112. I/O intensity may be characterized, e.g., based on an overall response time (latency) of an I/O operation, a throughput or bandwidth of the I/O operation, and/or a count of a number of I/O operations.

In other examples, a GETPAGE metric may refer to a count of a number of times that a given transaction of the application 116 requests a given page of objects from the page-fixed buffer pool 118. There may be one or more GETPAGE counts for a given page with respect to a given transaction, but the GETPAGE count for a transaction may be fairly stable over multiple instances of the transaction. Therefore, the GETPAGE metric may be a useful indicator in characterizing a level of access activity of a given page, or object(s) thereof.

In order to manage object transfers between the page-fixed buffer pool 118 and one or more of the virtual buffer pools 124, 130, the buffer pool manager 102 may execute a pool monitor 136 that monitors access activity and other relevant metrics associated with the page-fixed buffer pool 118 and the virtual buffer pools 124, 130. The pool monitor 136 may thus capture, over time, a plurality of pool profiles 138.

Similarly, the buffer pool manager 102 may execute an object activity monitor 140 that monitors access activity and other relevant metrics associated with individual objects of the page-fixed buffer pool 118 and the virtual buffer pools 124, 130, i.e., the objects 120, 122, 126, 128, 132, 134. The object activity monitor 140 may thus capture, over time, a plurality of object profiles 142.

The pool profiles 138 and the object profiles 142, which may also be referred to as performance profiles, may be used to capture characteristics of the various buffer pools and objects within the various buffer pools. Such characteristics may include, e.g., a size of the pool or object or an access frequency of the pool or object. The pool profiles 138 and the object profiles 142 may also characterize a manner in which each pool or object is accessed, e.g., randomly or sequentially. Additional aspects and examples of the pool profiles 138 and the object profiles 142 are provided below, or would be apparent to one of skill in the art.

A memory monitor 144 may be configured to monitor a total amount of memory available to, and/or assigned to, the main memory 117 of the LPAR 110. For example, other LPARs, not shown in FIG. 1, may also be allocated with a quantity of main memory. More generally, a quantity of main memory 117 usable by the buffer pool manager 102 may be shared by, and thus limited by, other computing resources.

The memory monitor 144 may also be configured to monitor a quantity of the main memory 117 available to, and/or assigned to, the page-fixed buffer pool 118. For example, the main memory 117 assigned to the LPAR 110 at any given time may be required to be shared among multiple page-fixed buffer pools, including the page-fixed buffer pool 118.

An object handler 146 may thus be configured to access the pool profiles 138, the object profiles 142, and current outputs of the memory monitor 144 characterizing available quantities of main memory 117 available with respect to the LPAR 110 (and to a given page-fixed buffer pool(s) 118 stored therein). Based on the pool profiles 138 and the object profiles 142 and on quantities of available memory, the object handler 146 may populate a ranking repository 148 with a current ranking of the various buffer pools and objects included therein.

As described in more detail, below, the ranking repository 148 ranks the various buffer pools and included objects in an order that indicates a likelihood of providing optimized use of the main memory 117 with respect to operations of the application 116. For example, objects 126, 128, 132, 134 in the virtual buffer pools 124, 130 may be ranked according to levels of access activity by the application 116, including, e.g., I/O intensity. Meanwhile, objects 120, 122 in the page-fixed buffer pool 118 may be ranked according to an estimated I/O intensity that each object would experience if moved to the secondary memory 112, where the estimated I/O intensity may be provided based on a GETPAGE metric of each of the objects 120, 122, as referenced above and described in more detail, below.

The object handler 146 may determine whether a transfer trigger is detected that initiates a transfer of objects between the secondary memory 112 and/or the main memory 117. In some examples, the transfer trigger may include an elapsed time since a most-recent object transfer or may include any pre-scheduled or predicted transfer time.

In other examples, the transfer trigger may be determined based on a transfer threshold that indicates a level of CPU savings that would be experienced in response to a potential and available object transfer. For example, the object handler 146 may determine that a threshold number of CPU cycles may be saved by moving the object 126 from the virtual buffer pool 124 to the page-fixed buffer pool 118, which may satisfy a pre-determined transfer trigger criterion. Additional examples of transfer triggers are provided below, or would be apparent to one of skill in the art.

Once a transfer trigger has been detected and one or more objects have been selected by the object handler 146 for transfer to/from the secondary memory 112 and the main memory 117, a directive generator 150 may be configured to generate directives to execute such transfers. For example, the directive generator 150 may generate a directive to transfer one or more selected objects between existing page-fixed buffer pools 118 and virtual buffer pools 124,130. In some cases, in related operations, it may be necessary to increase or decrease a size of such buffer pools to accommodate the desired transfer. In other examples, it may be necessary to create a new (e.g., replica) buffer pool to contain the transferred object(s). In addition to the generated directives for implementing an object transfer, the directive generator 150 may also generate additional directives, designed to undo operations of the generated directives. These additional directives may thus be available for use in the future, e.g., when an object transferred to the page-fixed buffer pool 118 in the main memory 117 is required to be transferred back to the secondary memory 112.

Using these and other directives, the buffer pool manager 102 may be configured to execute the specified object transfers. All directives generated and utilized may be stored in a directive repository 152, for future re-use and/or for historical analysis.

For example, whereas the above operations have been described as being execute in reaction to currently detected pool or object profiles, a scheduler 154 may be used to schedule future object transfers in a pro-active manner, e.g., before a transfer trigger actually occurs, or in anticipation of a future, anticipated transfer trigger. For example, the pool profiles 138, object profiles 142, ranking repository 148, and directive repository 152 may all contain data that is time-stamped at a time of collection. Accordingly, the scheduler 154 may detect trends, patterns, or other indicators of a potential or upcoming need for an object transfer, which may be used to schedule future transfers in an anticipatory manner.

For example, the scheduler 154 may detect high levels of access activity that occur with respect to certain objects at certain times of day, or certain days of the week or month, for an instance of the application 116. The scheduler 154 may thus schedule corresponding object transfers in advance of the access activity actually occurring, e.g., using directives stored in the directive repository 152.

In other examples, the scheduler 154 may train a machine learning (ML) model to analyze trends within the pool profiles 138, object profiles 142, ranking repository 148, and directive repository 152. Once trained, the resulting ML model may be used to predict a future need for an object transfer, based on an occurrence and detection of any of the training parameters used to train the ML model. For example, such training parameters may include a rate of change of access activity of an object(s), various parameters or operations of the application 116, and/or changes in available quantities of the main memory 117 within the LPAR 110.

Thus, rather than simply ranking and page-fixing I/O intensive virtual buffer pools 124, 130, as a whole, described techniques address I/O intensities of individual objects of buffer pools. Consequently, described techniques provide CPU optimization with respect to buffer pool activity, as well as automated buffer pool tuning to determine optimal usages and configurations for page-fixed memory resources. Described techniques provide system resource management that facilitates determinations of when page-fixed buffer pools 118 may be reduced in size based on changing object requirements, thereby making physical storage resources available for other consumers on the LPAR. Additionally, described techniques provide predictive analyses to determine optimal times for configuration optimization changes based on long-term performance analyses.

In the example of FIG. 1, the at least one computing device 104 may represent one or more servers or other computers. For example, the at least one computing device 104 may be implemented as two or more servers in communications with one another over a network. The at least one computing device 104 may provide the buffer pool manager 102 by executing corresponding instructions stored on the non-transitory computer-readable storage medium 108, using the at least one processor 106.

Figure 2:
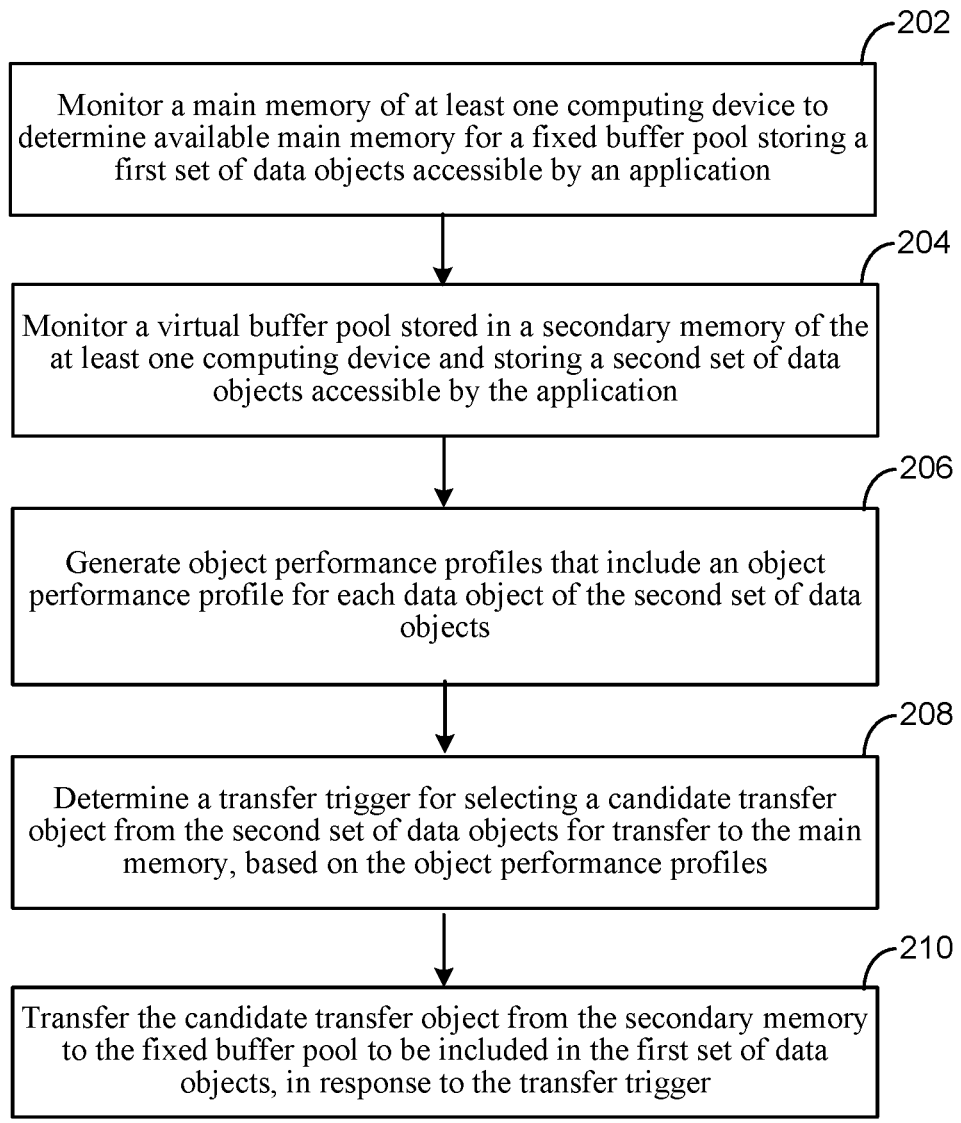
FIG. 2 is a flowchart illustrating example operations of the system of FIG. 1.

FIG. 2 is a flowchart illustrating example operations of the system of FIG. 1. In the example of FIG. 2, operations 202-210 are illustrated as separate, sequential operations. In various implementations, the operations 202-210 may include sub-operations, may be performed in a different order, may include alternative or additional operations, or may omit one or more operations. Further, in all such implementations, included operations may be performed in an iterative, looped, nested, or branched fashion.

In the example of FIG. 2, a main memory of at least one computing device may be monitored to determine available main memory for a fixed buffer pool storing a first set of data objects accessible by an application (202). For example, the memory monitor 144 may monitor the main memory 117 assigned to the LPAR 110, relative to a total amount of main memory of the at least one computing device 104 that can be assigned to the LPAR 110. The memory monitor 144 may thus determine the available quantity of main memory for the page-fixed buffer pool 118. For example, as described herein, the available quantity of main memory 117 may be assessed with respect to changing a size of the page-fixed buffer pool 118 that already is stored therein, and/or with respect to adding a new page-fixed buffer pool.

A virtual buffer pool stored in a secondary memory of the at least one computing device and storing a second set of data objects accessible by the application may be monitored (204). For example, the pool monitor 136 and the object activity monitor 140 may monitor the virtual buffer pools 124, 130 of the secondary memory 112, which include the objects 126, 128, 132, 134.

Object performance profiles may be generated that include an object performance profile for each data object of the second set of data objects (206). For example, the object activity monitor 140 may generate the object profiles 142, as described above. As also described, the pool monitor 136 may generate the pool profiles 138, based on access activity of the virtual buffer pools 124, 130 as a whole(s) (i.e., based on aggregated object characteristics, as compared to individual object characteristics).

A transfer trigger may be determined for selecting a candidate transfer object from the second set of data objects for transfer to the main memory, based on the object performance profiles (208). For example, the object handler 146 may be configured to determine a quantity of CPU savings that would be obtained in conjunction with a potential transfer of the candidate transfer object(s) and may determine the presence of the transfer trigger when the determined CPU savings exceed a pre-determined threshold. In additional or alternative examples, the transfer trigger may include a scheduled or predicted transfer time.

The candidate transfer object may be transferred from the secondary memory to the fixed buffer pool to be included in the first set of data objects, in response to the transfer trigger (210). For example, the object handler 146 may cause the directive generator 150 to generate suitable directives for executing the desired transfer. As described herein, e.g., with respect to FIGS. 3 and 4, such a transfer may include replicating an existing virtual buffer pool 124, 130 within the main memory 117 as a dedicated page-fixed buffer pool 118, to be populated with one or more transferred objects. In other implementations, such a transfer may include a transfer of the candidate transfer object to an existing page-fixed buffer pool 118 that is shared with other pages or objects.

Figure 3:
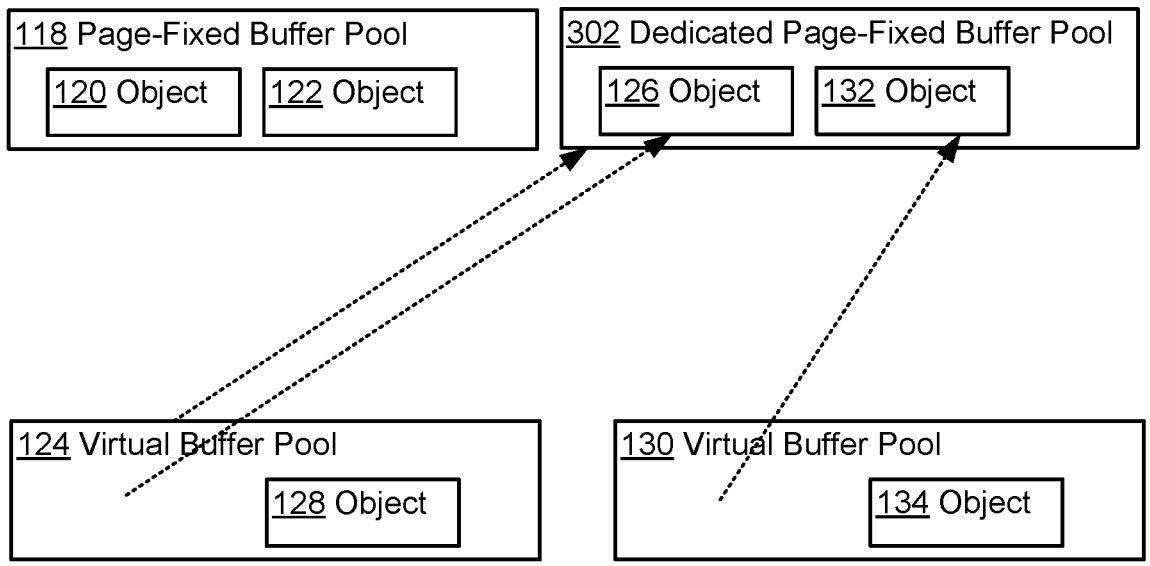
FIG. 3 is a block diagram illustrating a first example of an object transfer according to the embodiments of FIGS. 1 and 2.

FIG. 3 is a block diagram illustrating a first example of an object transfer according to the embodiments of FIGS. 1 and 2, referred to herein as a dedicated mode. In the example of FIG. 3, it is assumed that the page-fixed buffer pool 118 exists within the main memory 117, as already described, and that objects 126 and 132 have been identified as candidate transfer objects.

As shown, a dedicated page-fixed buffer pool 302 may be provided to receive the object 126 and the object 132. For example, the virtual buffer pool 124 may be replicated within the main memory 117 to provide the dedicated page-fixed buffer pool 302. That is, the dedicated page-fixed buffer pool 302 may be created using the profile and characteristics of the virtual buffer pool 124. Then, both the object 126 and the object 134 may be transferred to the replicated, dedicated page-fixed buffer pool 302.

For example, the virtual buffer pool 124 may have a determined pool performance profile, while the objects 126, 128 have corresponding object performance profiles. Similar comments apply to the virtual buffer pool 130 and the objects 132, 134. As described in detail, herein, it is preferable, and sometimes necessary, for all objects within a buffer pool to have the same or similar characteristics, e.g., access characteristics, so that the buffer pool as a whole exhibits such a characteristic(s). By grouping objects with similar object performance profiles, the application 116 may be more efficient in accessing desired objects, and CPU resources may be conserved.

For example, the objects 126, 128 may be accessed sequentially, as compared to randomly. In such a case, the dedicated page-fixed buffer pool 302 may be replicated based on the virtual buffer pool 124 and designated for objects having the same characteristics (including sequential access). If the objects 132, 134 of the virtual buffer pool 130 are also sequential access (and otherwise share performance characteristics), then the object 132 may be transferred to the replicated, dedicated page-fixed buffer pool 302, as well, as shown in FIG. 3.

In an alternative example, not shown in FIG. 3, it could occur that the object 132 is randomly accessed, instead of sequentially accessed. In such a case, it may be required to replicate the virtual buffer pool 130 as a separate dedicated page-fixed buffer pool, to receive the object 132 and maintain a desired conformity between pool and object performance profiles.

Figure 4:
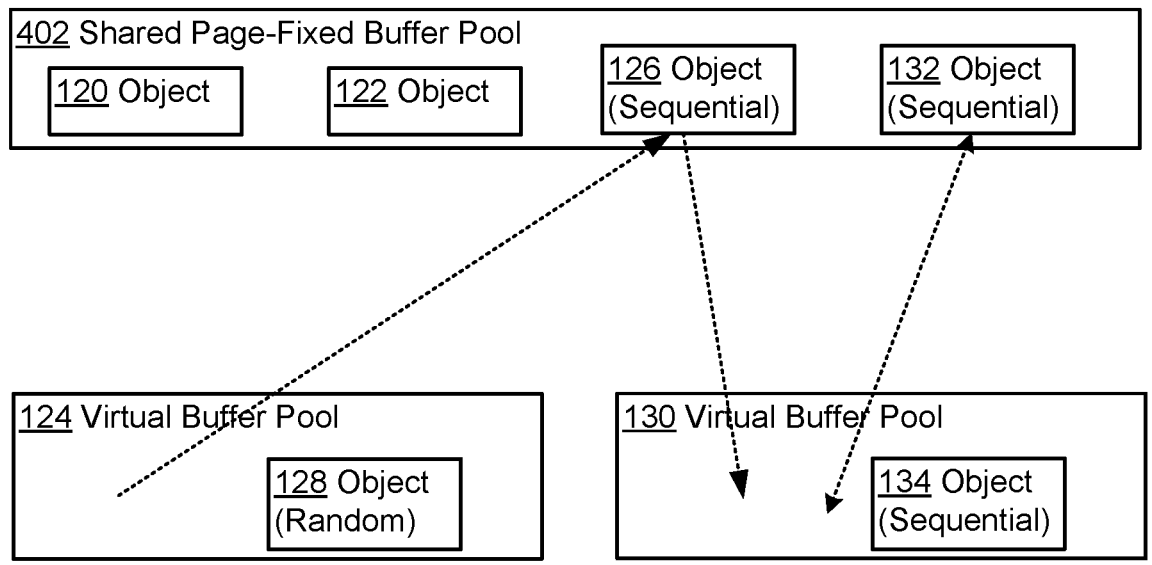
FIG. 4 is a block diagram illustrating a second example of an object transfer according to the embodiments of FIGS. 1 and 2.

FIG. 4 is a block diagram illustrating a second example of an object transfer according to the embodiments of FIGS. 1 and 2, referred to herein as a shared mode. In the example of FIG. 4, a shared page-fixed buffer pool 402 receives the objects 126, 132. That is, as shown, the shared page-fixed buffer pool 402 includes the objects 120, 122, and has sufficient main memory resources available to also contain the transferred objects 126, 132.

In some scenarios, it may occur that virtual buffer pools are generated and populated with objects that do not share similar object performance profiles. In the example of FIG. 4, it may occur that the object 126 has a first performance characteristic (e.g., sequential access) while the object 128 has a second performance characteristic (random access). Meanwhile, the objects 132, 134 may both have sequential access.

In FIG. 4, similar to FIG. 3, the object 126 and the object 132 are identified as candidate transfer objects. In contrast to FIG. 3, as shown, the object 126 and the object 132 are transferred to the shared page-fixed buffer pool 402, rather than replicating or otherwise generating a new instance of a dedicated page-fixed buffer pool.

While stored in the shared page-fixed buffer pool 402, the objects 126, 132 may continue to be monitored by the object activity monitor 140. When measured or estimated access activity of the objects 126, 132 drops below a transfer threshold, or the object handler 146 otherwise determines a transfer trigger, the objects 126, 132 may be transferred out of the shared page-fixed buffer pool 402 to conserve CPU resources.

When doing so, the object handler 146 may group the transferred objects 126, 132 with respect to one another and with respect to a receiving virtual buffer pool 130, so that all objects 126, 132, 134 within the receiving virtual buffer pool 130 have the same or similar performance profiles. For example, in the example of FIG. 4, the objects 126, 132 are transferred to the virtual buffer pool 130 to be included within the virtual buffer pool 130. Accordingly, objects with sequential access are grouped within the virtual buffer pool 130, and the virtual buffer pool 124 includes only object(s) 128 exhibiting random access.

Put another way, FIG. 4 illustrates that objects with varying object performance profiles within multiple virtual buffer pools may be transferred to page-fixed buffer pools and grouped by profile characteristics. Then, upon transfer back to the virtual buffer pools, the various objects may be separated by type within the virtual buffer pools. As a result, over a period of time and/or number of transfers, the various virtual buffer pools each exhibit more consistent performance profiles and provide more efficient object access. More detailed examples are provided below, e.g., with respect to FIG. 11. In other examples, the objects 126, 132 may simply be returned to the virtual buffer pools from which they were originally transferred. Also, although FIG. 4 is illustrated with respect to shared-mode operations, the described processes for obtaining performance-matched pools and profiles may be used in the dedicated-mode operation example of FIG. 3, as well.

Figure 5:
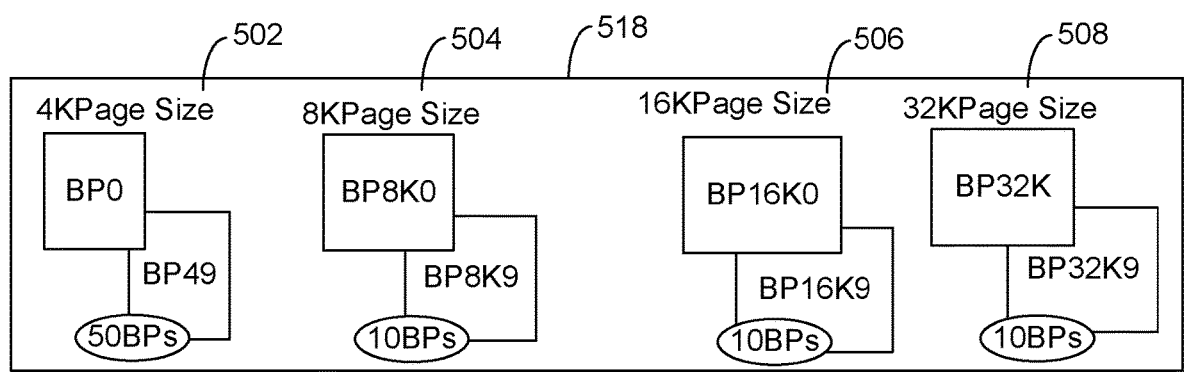
FIG. 5 illustrates an example size distribution of buffer pools that may be used in the example implementation of FIG. 1.

FIG. 5 illustrates an example size distribution of buffer pools that may be used in the example implementation of FIG. 1. Specifically, FIG. 5 provides an example in the context of the Db2 database system mentioned above, i.e., in which the application 116 represents a Db2 database system.

By design, each such Db2 database system application 116 may have up to 80 buffer pools, although not all of the existing set of buffer pools may be in use (or may be only partially used) at a given time. Moreover, the LPAR 110 may be used to execute multiple instances of the application 116, a Db2 database system.

Operations of the buffer pool manager 102 may be performed across all such instances of the application 116, to maximize CPU efficiency. For example, if two instances of the application 116 are executing (each with 80 buffer pools), then the buffer pool manager 102 may operate to rank all objects of all 160 buffer pools for potential transfer between available page-fixed buffer pools 118 and virtual buffer pools 124,130. As described herein, the various objects may be ranked based on their respective levels of access activity (e.g., I/O intensity), without regard to which application instance a given object belongs.

FIG. 5 illustrates an example set of 80 buffer pools in Db2 application 518. A first buffer pool set 502 includes 50 buffer pools, a second buffer pool set 504 includes 10 buffer pools, a third buffer pool set 506 includes 10 buffer pools, and a fourth buffer pool set 508 includes 10 buffer pools.

As further illustrated, in the first buffer pool set 502, each buffer pool has a 4K page size. Each buffer pool in the second buffer pool set 504 has an 8K page size. Each buffer pool in the third buffer pool set 506 has a 16K page size. Each buffer pool in the fourth buffer pool set 508 has a 32K page size.

Buffer pools of a set of 80 buffer pools may be of varying sizes. For example, the buffer pools of the first buffer pool set 502 may be one MB each in size, and populated with up to 250 pages. Each such page may be designated to contain one or more objects, depending on sizes of the objects.

As referenced above, various commands or directives may be used to create buffer pools of desired sizes, or to change an existing size of a buffer pool to a desired size. Some example directives in the Db2 context are provided below, in Table 1, with respect to discussion of FIG. 8.

Figure 6:
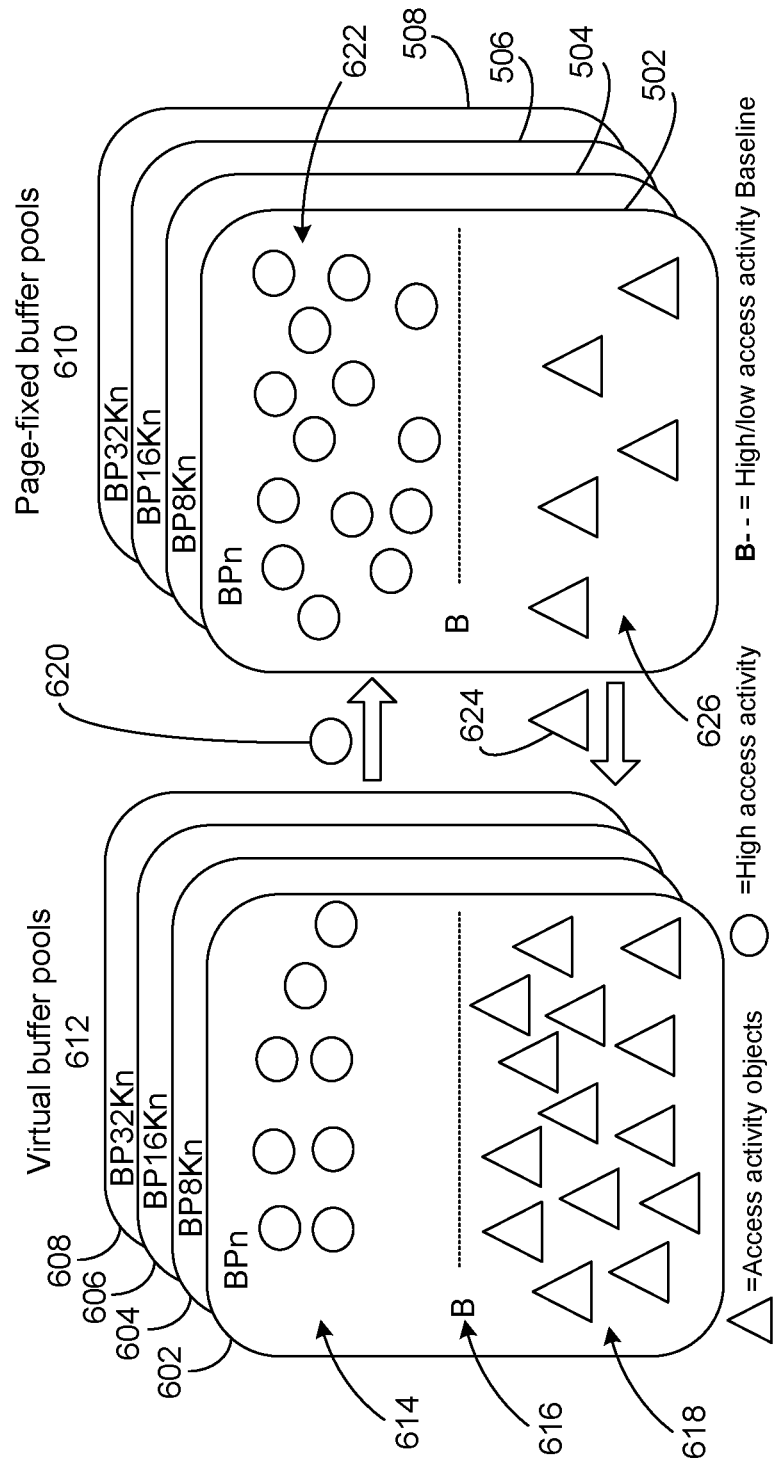
FIG. 6 is a block diagram illustrating an example transfer process for transferring objects between virtual buffer pools and page-fixed buffer pools.

FIG. 6 is a block diagram illustrating an example transfer process for transferring objects between virtual buffer pools 124, 130 and page-fixed buffer pools 118. In the example of FIG. 6, the buffer pools 502, 504, 506, 508 of FIG. 5 are illustrated as page-fixed buffer pools 610. A corresponding set of virtual buffer pools 612 is illustrated as including a buffer pool set 602, a buffer pool set 604, a buffer pool set 606, and a buffer pool set 608.

As shown in the example of FIG. 6, objects 614 in the buffer pool set 602 may include objects with a high I/O intensity, relative to a designated or determined activity baseline B 616. Meanwhile, objects 618 in the buffer pool set 602 may include objects with a low I/O intensity, relative to the activity baseline B 616.

An object 620 of the objects 614 may therefore be transferred to the buffer pool set 502, which may itself include objects 622 having high I/O intensity levels of access activity relative to the activity baseline B 616. As described with respect to FIG. 3, if the object 620 is a first object to be transferred to the buffer pool set 502, it may be necessary to replicate the buffer pool set 602 with appropriate characteristics, including, e.g., setting a page size of 4K.

The buffer pool set 502 may also include objects 626 that have low I/O intensity levels of access activity relative to the activity baseline B 616. For example, the objects 626 may have previously had high I/O intensity levels of access activity at an earlier time, but due to operations and requirements of the application 116, may currently have low I/O intensity levels of access activity. For example, the object 620, after being transferred to the buffer pool set 502, may experience decreased access activity levels over time, and may be ranked within the objects 626. Accordingly, an object 624 may be transferred back to the virtual buffer pools 612, for inclusion in the objects 618.

Figure 7:
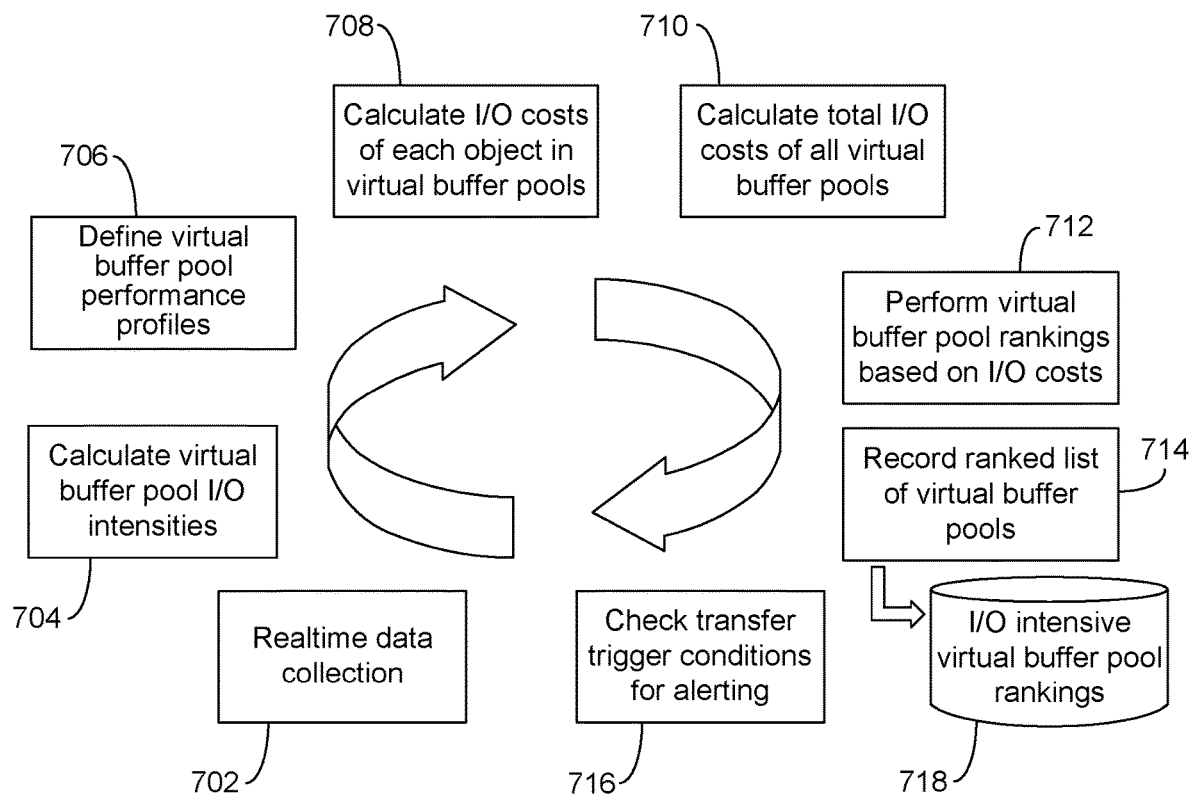
FIG. 7 is a flowchart illustrating example operations for monitoring and ranking objects in virtual buffer pools.

FIG. 7 is a flowchart illustrating example operations for monitoring and ranking objects in virtual buffer pools. In FIG. 7, realtime data collection (702) may include collecting and storing data elements required for Key Performance Indicators (KPIs), while preserving associated timestamps.

For example, the term KPI should be understood broadly to represent or include any measurable value that can be used to indicate a past, present, or future condition, or enable an inference of a past, present, or future condition with respect to a measured context (including, e.g., the example contexts referenced below). Some KPIs may be required to be calculated from a plurality of individual data elements, such as when multiple data elements occur over a period of time and a suitable formula or equation may be used to calculate a corresponding KPI that describes a rate over time, such as the GETPAGE rate referenced herein.

The collected data may be used to calculate I/O intensities for all available virtual buffer pools (704). That is, collective I/O intensities for the various virtual buffer pools may be determined.

Virtual buffer pool performance profiles may be defined (706). The virtual buffer performance profiles may change over time. For example, as described with respect to FIGS. 4 and 9, virtual buffer pools may be optimized using described processes by aligning characteristics of objects stored therein, which may change and improve associated performance profiles.

I/O costs of each object in the virtual buffer pools may be calculated (708). For example, each of the objects may be identified in memory while active and corresponding measurements in control blocks may be determined. For example, one or more Instrumentation Facility Component Identifiers (IFCIDs) and associated Application Program Interfaces (APIs) may be used to access required data for object-level I/O costs to be calculated. For example, a number of I/Os per second for a given object may be determined.

Total I/O costs of the virtual buffer pools may be calculated (710). Then, ranking of the virtual buffer pools based on I/O costs may be performed (712). For example, each object may be characterized based on a percentage of a corresponding virtual buffer pool I/O cost for which I/O costs of that object are responsible. The ranked list of virtual buffer pools may be recorded (714), e.g., in I/O intensive virtual buffer pool rankings (718).

Transfer conditions may be checked to determine whether an alert for initiating an object transfer is needed (716). As described herein, such a transfer trigger may include an analysis as to whether a designated threshold of CPU cycles may be saved by transferring out a corresponding number or percentage of high-I/O-cost objects. Additionally, or alternatively, the transfer trigger may include the passing of a pre-determined quantity of time, or the reaching of a scheduled transfer time.

Transfer conditions may also relate to a number or percentage of objects above a transfer threshold, such as the threshold 616 of FIG. 6. Such a transfer threshold may be determined, e.g., as a baseline level of I/O costs determined from a historical analysis.

Figure 8:
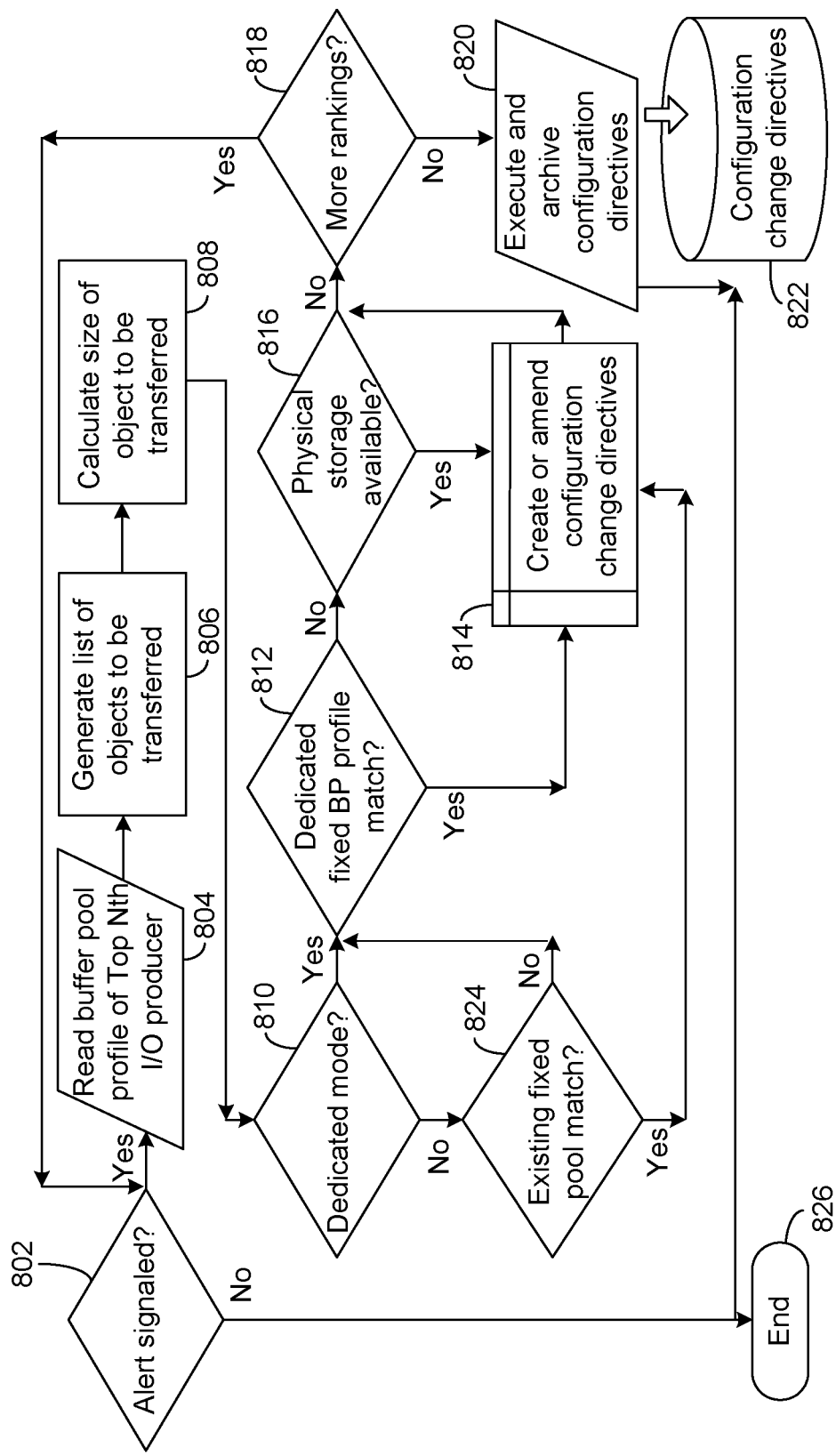
FIG. 8 is a flowchart illustrating example operations for generating buffer pool optimization change directives.

FIG. 8 is a flowchart illustrating example operations for generating buffer pool optimization change directives. In FIG. 8, a check is made to determine whether an alert has been signaled (802) as a result of operations of FIG. 7. If not, the process of FIG. 8 ends (826) and the data collection process of FIG. 7 continues.

If an alert is received (802), buffer pool profiles of the top Nth I/O producers may be determined (804) from the rankings 718 of FIG. 7, relative to the designated baseline. From these profiles, a list of objects to be transferred may be generated (806), and a size of object(s) to be transferred may be calculated (808).

If the system is operating in a dedicated mode (810), as described with respect to FIG. 3, then a check may be made for a dedicated fixed-page buffer pool profile match (812). If such a dedicated fixed-page buffer pool exists (perhaps from an earlier iteration), then relevant configuration-change directives may be created or amended (814). For example, directives may be provided to transfer objects from their virtual buffer pools to the existing dedicated fixed-page buffer pool, perhaps in conjunction with directives for changing a size of the dedicated fixed-page buffer pool, if needed.

If a dedicated fixed-page buffer pool does not exist (812), and if physical storage is available (816), then relevant configuration-change directives may be created or amended (814). For example, directives may be issued to allocate suitable amounts of more real storage and replicate a relevant virtual buffer pool as a dedicated fixed-page buffer pool to be used as a container for the object(s) to be transferred. Then, directives may be provided to transfer objects from their virtual buffer pools to the existing dedicated fixed-page buffer pool.

Once the directives are generated (814) (or if no real storage was available (816)), then a check may be made for remaining object rankings (818). If so, the process continues (804). When no rankings remain (818), then the various configuration directives may be executed and then archived in configuration-change directives (822) (820), and the process ends (826).

Figure 9:
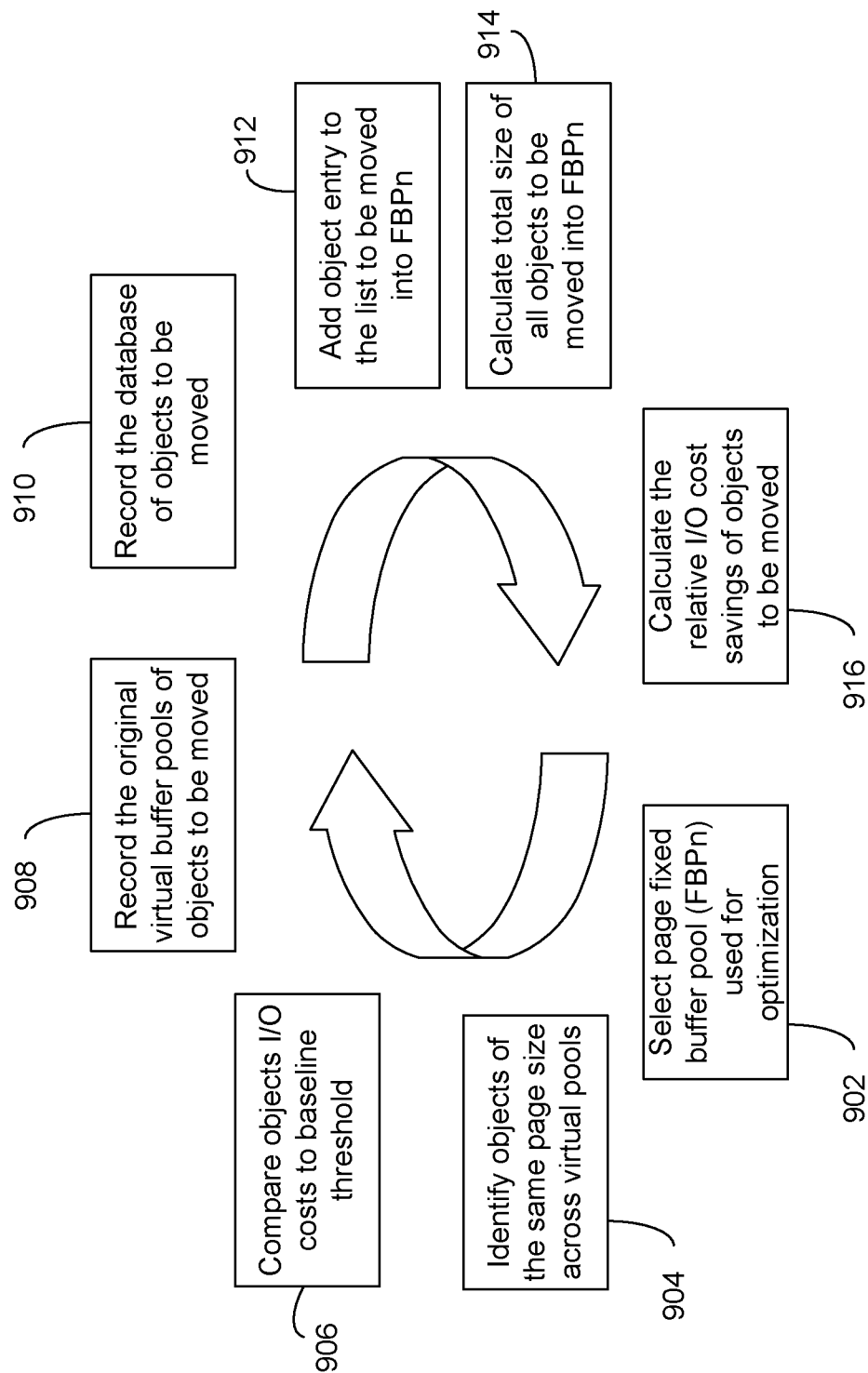
FIG. 9 is a flowchart illustrating example operations for selecting objects to be moved into page-fixed buffer pools from virtual buffer pools.

FIG. 9 is a flowchart illustrating example operations for selecting objects to be moved into page-fixed buffer pools from virtual buffer pools. In the example of FIG. 9, it is assumed that the rankings of FIGS. 7 and 8 are available, and that the buffer pool manager 102 of FIG. 1 is operating to select a page-fixed buffer pool(s) in either a dedicated or shared mode to generate directives for executing object transfer of ranked objects from virtual buffer pools to the selected page-fixed buffer pool(s).

In FIG. 9, a page-fixed buffer pool is selected that is to be used for optimization (902). For example, as just referenced, and as described previously, a page-fixed buffer pool can be replicated if in dedicated mode (or a previously replicated page-fixed buffer pool can be selected), or an existing page-fixed buffer pool can be selected if in shared mode. In this way, fixed-page buffer pools with performance profiles matching potential transferred objects may be identified.

Then, objects of the same page size across virtual buffer pools may be identified (904). That is, as described with respect to FIGS. 5 and 6, objects in virtual buffer pools to be transferred may be maintained consistently with corresponding page sizes of the selected fixed-page buffer pools.

Using the previously determined rankings, I/O costs of the identified objects may be compared to a baseline threshold (906). After selecting a number of objects above this threshold (e.g., analogous to the objects 614 of FIG. 6), the original virtual buffer pools from which the objects will be transferred may be recorded (908). For example, this recorded information may be used later if returning a transferred object to its original virtual buffer pool, or to perform trend analysis.

Similarly, a database to which the transferred objects belong may be recorded (910). Again, this recorded data may be used to facilitate future transfers and/or trend analysis.

An object entry may then be added to a list of objects to be moved into the previously determined fixed-page buffer pool (912). A total size of all of these objects may then be calculated (914), so that a total relative I/O cost savings of moving the objects may be calculated (916).

Figure 10:
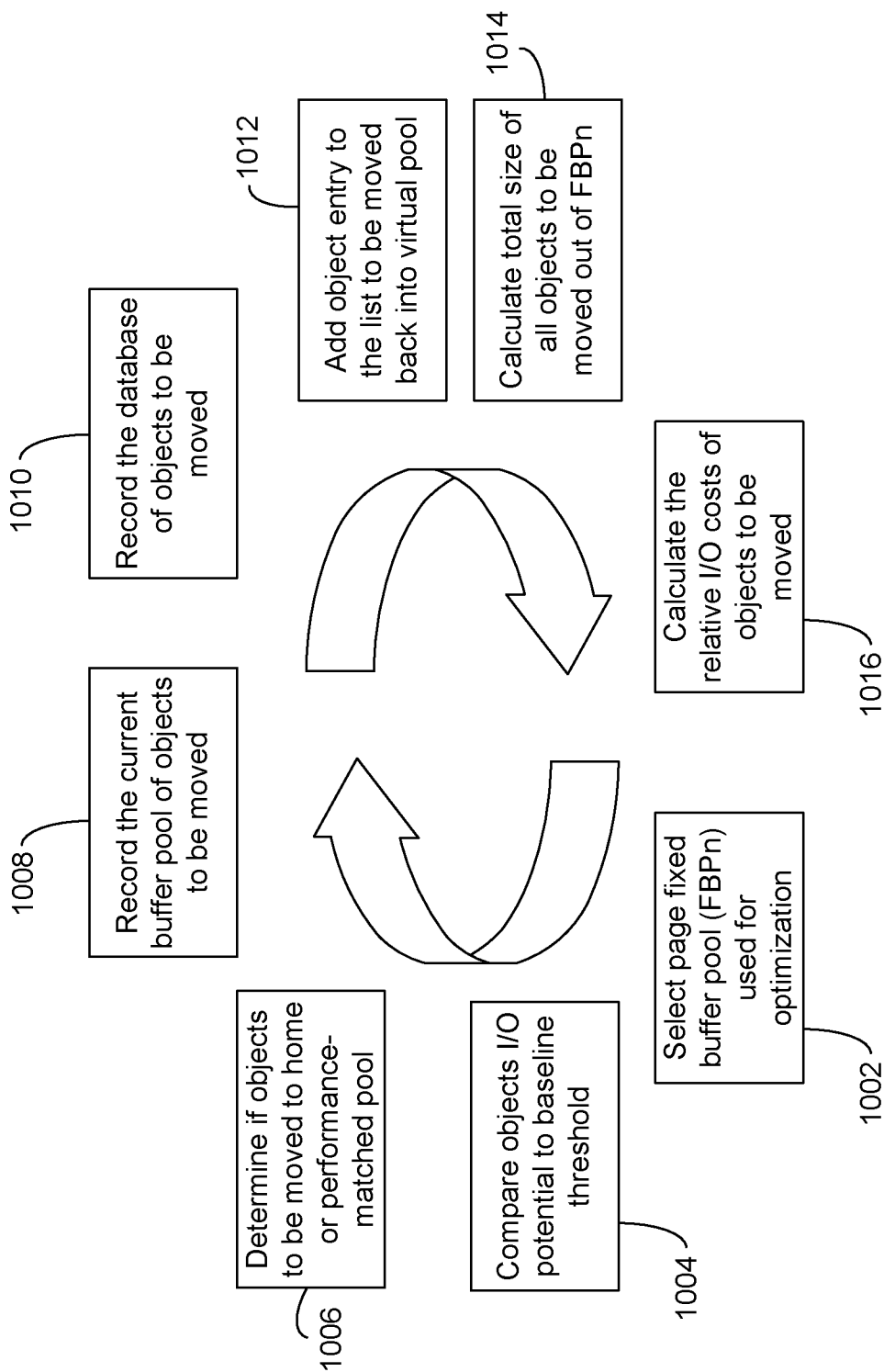
FIG. 10 is a flowchart illustrating example operations for selecting objects to be moved into virtual buffer pools from page-fixed buffer pools.

FIG. 10 is a flowchart illustrating example operations for selecting objects to be moved into virtual buffer pools from page-fixed buffer pools, i.e., example object transfer operations that are in a reverse direction of the object transfers of FIG. 9. In the example of FIG. 10, it is assumed that rankings corresponding to the rankings of FIGS. 7 and 8 are available for the context of objects in fixed-page buffer pools, and that the buffer pool manager 102 of FIG. 1 is operating to select a page-fixed buffer pool(s) to generate directives for executing object transfer of ranked objects from fixed-page buffer pools to selected virtual buffer pool(s).

In more detailed examples in the Db2 context, specific IFCID performance records known as IFCID 198 performance records may be generated by Db2, which track buffer manager page access in Db2. The buffer manager page access may be used to obtain GETPAGE counts for each table space or index space, which may thus be accumulated along with their respective physical I/O counts. These metrics can be used to calculate an I/O intensity relative to table space or index space activity levels. By establishing a standard collection period, accumulations of I/O and GETPAGE counts can be weighed equally to determine the best candidates for transferal from virtual buffer pools to page-fixed buffer pools.

Thus, in FIG. 10, a page-fixed buffer pool is selected that is to be used for optimization (1002). For example, such selection operations may be executed in response to various transfer triggers, such as passage of a pre-determined quantity of time, reaching a scheduled time, or rankings of objects in the page-fixed buffer pool(s), similar to the ranking operations of FIG. 7.

Potential or estimated I/O costs of objects of the identified fixed-page buffer pool(s) may be compared to a baseline threshold (1004). That is, as described above, objects within a fixed-page buffer pool do not have actual I/O costs, because I/O transactions are not required for accessing objects fixed in main memory 117. Nonetheless, described techniques may use a GETPAGE rate of a fixed page, compared to historical ratios of GETPAGE rate to I/O intensity. That is, the historical ratios and a current GETPAGE rate can be used to provide a heuristic for estimating a hypothetical I/O intensity if the page or object being considered were transferred to a virtual buffer pool.

In other words, the selection of objects that would be best to transfer from page-fixed buffer pools into virtual buffer pools will involve the use of a different KPI than the selection process for the opposite flow (i.e., of FIG. 9). The intrinsic value of page-fixed buffer pools will result in the relative absence of I/O counts that are used to calculate I/O intensity. Therefore, as just referenced, a KPI that is based on an approximate I/O intensity potential may be utilized. For example, the GETPAGE rate of a measured object might be used in conjunction with the historical ratio of I/O events to GETPAGE counts in order to approximate an I/O intensity potential. The transfer of objects (e.g., analogous to the objects 626 of FIG. 6) would then be prioritized based on the lowest potential.

A determination may be made as to whether objects to be moved should be returned to original virtual buffer pools from which the objects were previously transferred, or moved to new virtual buffers that more closely align or match buffer pool or object performance profiles. As described with respect to FIGS. 4 and 11, such alignment of buffer or object performance profiles may provide additional increases in access speeds and efficiencies with respect to object access activities of the application 116.

After selecting a number of objects to transfer, the original fixed-page buffer pools from which the objects will be transferred may be recorded (1008). For example, this recorded information may be used later to perform trend analysis.

Similarly, a database to which the transferred objects belong may be recorded (1010). Again, this recorded data may be used to facilitate future transfers and/or trend analysis.

An object entry may then be added to a list of objects to be moved into the previously determined virtual buffer pool (1012). A total size of all of these objects may then be calculated (1014), so that a total relative I/O cost of moving the objects may be calculated (1016).

Figure 11:
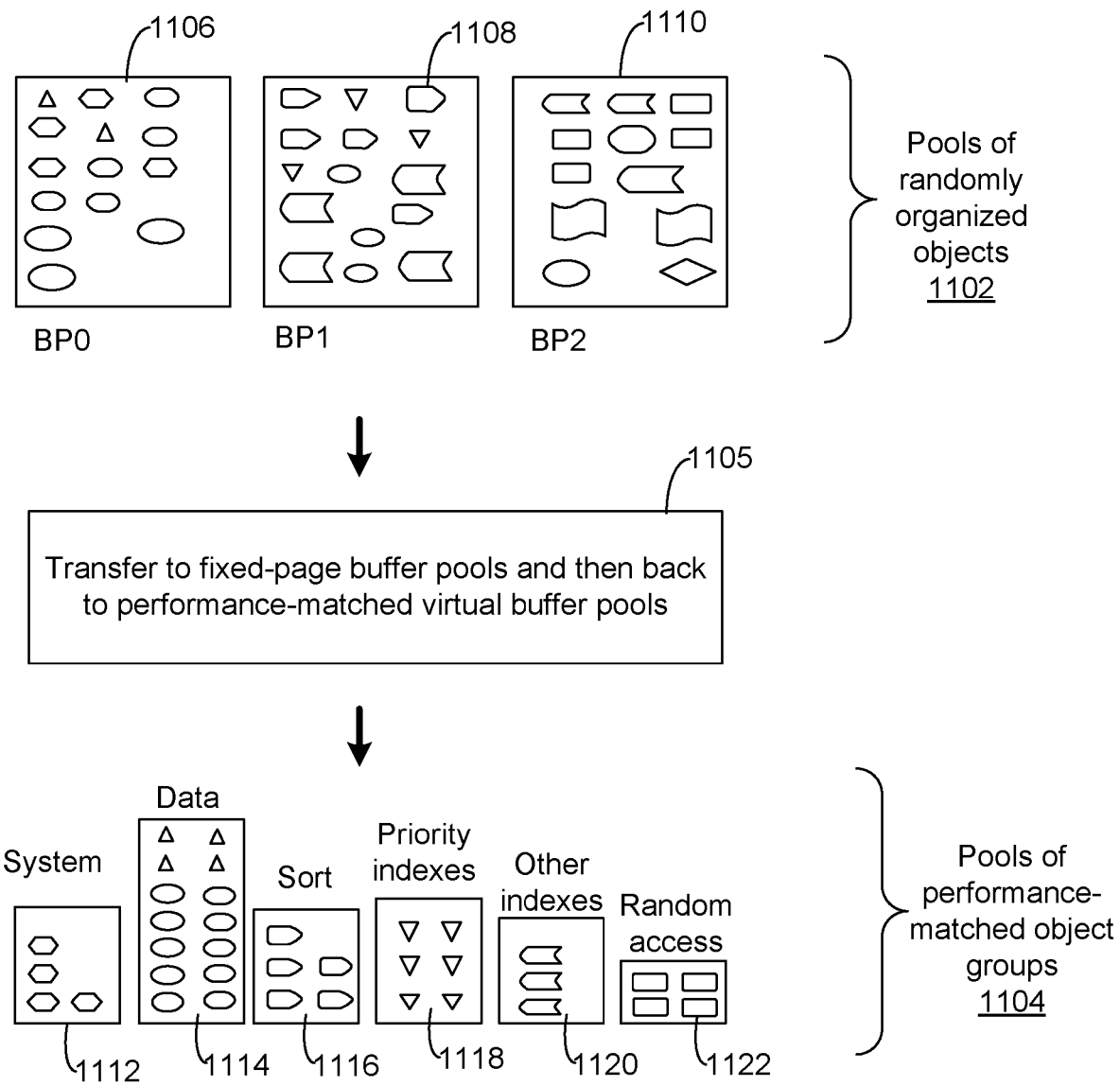
FIG. 11 is a block diagram illustrating example buffer pool allocations when returning objects from page-fixed buffer pools to virtual buffer pools.

FIG. 11 is a block diagram illustrating example buffer pool allocations when returning previously transferred objects from page-fixed buffer pools to virtual buffer pools. As referenced with respect to FIG. 4, buffer pools with objects having random object performance profiles tend to be less efficient in terms of object access activity. By taking advantage of the object transfer processes described herein, it is possible to migrate such randomly organized virtual buffer pools into more systematically organized virtual buffer pools.

FIG. 11 illustrates virtual buffer pools 1102 that include randomly organized buffer pools 1106, 1108, 1110. That is, as shown, the various objects of the buffer pools 1106, 1108, 1110 have various object performance profiles, as indicated by the variations in object shapes, and as further set forth in performance-matched buffer pools 1104.

The various objects of the buffer pools 1106, 1108, 1110 may then go through transfer processes 1105. That is, corresponding to the preceding examples of FIGS. 8-10, the various objects of the buffer pools 1106, 1108, 1110 are transferred into fixed-page buffer pools (not shown separately in FIG. 11) in either a dedicated or shared mode, and then transferred back to virtual buffer pools 1104. In so doing, object profiles of the various objects of the buffer pools 1106, 1108, 1110*f* are performance-matched to pool profiles of the receiving virtual buffer pools, so that the virtual buffer pools 1104 are illustrated and described as performance-matched virtual buffer pools 1104.

Specifically, as shown, the performance-matched virtual buffer pools 1104 include a virtual buffer pool 1112 with system objects, virtual buffer pool 1114 with data objects, virtual buffer pool 1116 with sort objects, virtual buffer pool 1118 with priority index objects, virtual buffer pool 1120 with other index objects, and virtual buffer pool 1122 with random access objects. Of course, these are just examples provided to illustrate a nature of the described performance and/or profile matching, so that the various object types are not described here in detail, and many other object types may be used, as well.

FIG. 12 is a table illustrating examples of configuration optimization trigger events. In FIG. 12, a column 1202 indicates examples of potential configuration optimization trigger events, also referred to herein as transfer triggers. Column 1204 indicates whether a given transfer trigger is user configurable, and column 1206 indicates whether a given transfer trigger is set by default.

As shown in column 1202, such transfer triggers may include a specified date/time, a value of predictive relative I/O cost savings, and/or predictive peak object activity intervals. The date/time and predictive relative I/O cost savings are user configurable in the example of FIG. 12, while the predictive peak object activity intervals transfer trigger is not. As also illustrated in column 1204, the date/time transfer trigger is not set by default, while column 1206 illustrates that the predictive relative I/O cost savings and the predictive peak object activity intervals transfer trigger are set by default.

FIG. 13 is a table illustrating examples of operational controls for implementing example embodiments of the system of FIG. 1. In FIG. 13, a column 1302 indicates examples of potential control modes. Column 1304 indicates whether a given control mode is user configurable, and column 1306 indicates whether a given control mode is set by default. Column 1308 indicates a type of control mode.

As shown, such control modes in column 1202 may include a setting for a maximum quantity of real storage for optimization pools, two-phase optimization (as described with respect to FIG. 11), a choice of dedicated or shared mode(s), and a designation for locking objects in shared mode (e.g., so that existing objects in a shared buffer are not modifiable as part of the object transfer process). As illustrated in columns 1304 and 1306, all of the various control modes may be set to be user configurable and on by default. Column 1308 indicates that a control type may be characterized as a ceiling type for the maximum quantity of real storage for optimization pools, or otherwise as a functional type. It will be appreciated that the examples of FIG. 13 may include any suitable or available type of control mode.

As described herein, usage of page-fixed buffer pools may be optimized by cyclically analyzing the performance of individual data objects (e.g., tables, indexes, and tablespaces) within the virtual buffer pools, and then rotating high I/O intensive objects and low I/O intensive objects in and out of page-fixed buffer pools and virtual buffer pools. Such optimization may be accomplished, for example, by monitoring buffer pools over time to build a performance profile for each pool and monitoring individual objects over time to build a performance profile for each object. On regular intervals, the data required to produce KPIs for each buffer pool and all active objects is collected, and an approximate cost of I/O activity is calculated. The virtual buffer pools are then ranked based on the approximated I/O activity, as described above with respect to FIG. 7.

As also described above, two example modes of operation that determine an initial definition of the page-fixed buffer pools receiving transferred objects from virtual buffer pools include a dedicated mode and a shared mode. The dedicated mode results in the creation of an independent working set of page-fixed buffer pools that will be dedicated for continuous object-level performance optimization. In this dedicated mode, the virtual pools to be replicated are selected using a ranked order of KPIs determinant of I/O intensity (highest to lowest). The number of replicated buffer pools will be determined by the amount of real storage available to the Db2 or other application, or otherwise available on the LPAR 110. The virtual buffer pools that have been replicated may then be further examined to identify objects for transfer based on a defined KPI baseline, serving as a line of demarcation. Since each Db2 database system can have up to 80 buffer pools defined with varying page sizes, as shown in FIG. 5, replica page-fixed buffer pools may be created for any necessary page size (4K, 8K, 16K, 32K), and may thus form a working set of buffer pools under management for optimization.

In the shared mode, a search may be performed for previously existing page-fixed buffer pools that can be leveraged to optimize object-level performance, with additional page-fixed buffer pools added as needed. In contrast with the dedicated mode (in which all objects that populate any of the dedicated page-fixed buffer pools are subject to removal for optimization purposes), the shared mode only increases a size of page-fixed buffer pools to accommodate new objects, and those objects that initially occupy the shared buffer pool may be locked in place and not subject to removal.

Whether in dedicated or shared mode, objects may be selected for transfer by monitoring the KPIs of objects over time on a cyclical basis, so that the most I/O intensive and least I/O intensive objects can be delineated for specific intervals. On a predefined wall clock interval or a calculated peak interval, a set of directives may be generated that will add and remove objects across fixed and virtual buffer pools based on the priority determined from the specified KPIs used to establish a baseline. Additionally, a set of directives can be generated based on a predicted I/O cost savings threshold. For example, a set of directives may be created to move the most active objects into page-fixed buffer pools and move the least active objects in page-fixed buffer pools into non-fixed, virtual buffer pools. Such an ebb and flow of high-intensity and low-intensity objects results in a continuous automated optimization of page-fixed buffer pools, as shown and described with respect to FIG. 6.

A second phase of optimization may occur when low-activity objects are moved from page-fixed buffer pools back into virtual pools, as shown with respect to FIG. 4 and FIG. 11. As described, virtual buffer pools with similar performance profiles can be selected for transfer to gradually reorganize the overall configuration over time. Otherwise, low-activity objects may be moved back into their original virtual pools of origin.

The creation of configuration-change directives may be triggered based on predicted approximate I/O cost savings, predictive peak I/O activity intervals, or pre-determined cycle times. For any of these trigger mechanisms, configuration-change directives may be automatically generated to create new buffer pools when needed, move the objects to their respective virtual buffer pools or page-fixed buffer pools, and adjust buffer pool sizes based on the flow of objects.

A record of the configuration-change directives may be preserved in a repository along with a set of directives that can be used to reset the configuration back to its former state. For example, in the Db2 context, a combination of ALTER BUFFERPOOL, ALTER TABLESPACE, ALTER INDEX, STOP DATABASE, START DATABASE commands, for example, can constitute a set of directives that are dynamically determined and automatically generated using the described process. An alert may be generated for any transfer trigger, so that manual or automatic execution of the directives can be performed, as shown in FIG. 8. Examples of directives are shown below, in Table 1.

TABLE 1

```
//STEP01 EXEC PGM=KJEFTO1,DYNAMNBR=20,TIME=1800
//STEPLIB DD DISP=SHR,DSN=CSG.DLY.DSNEXIT
// DD DISP=SHR, DSN=CSGI.DB2V12M.DSNLOAD
//SYSUDUMP DD SYSOUT=*
//SYSTSPRT DD SYSOUT=*
//SYSPRINT DD SYSOUT=*
//SYSTSIN DD*
DSN SYSTEM (DLY7)
-STOP DATABASE(DSNDB04) SPACENAM(RAPTBST)
-STOP DATABASE(DSNDB04) SPACENAM(TESTRTAB)
  -STOP DATABASE DSNDB04) SPACENAM(DWQAMQTS)
-STOP DATABASE DSNDB04) SPACENAM (DXSPLITI)
-STOP DATABASE(DSNDB04) SPACENAM(DXFAST1)
-STOP DATABASE (DSNDB04) SPACENAM(DBZUTCHK)
-STOP DATABASE DSNDB04) SPACENAM(RAPTBST2)
-STOP DATABASE BMCNGTC1) SPACENAM(RTSCRIT) RUN PROGRAM(DSNTEP2)
-START DATABASE(DSNDB04) SPACENAM(RAPTBST)
-START DATABASE(DSNDB04) SPACENAM(TESTRTAB)
-START DATABASE(DSNDB04) SPACENAM(DWQAMQTS)
-START DATABASE(DSNDBO4) SPACENAM(XSPLITI)
-START DATABASE(DSNDB04) SPACENAM(X FAST1]
-START DATABASE(DSNDB04) SPACENAM(DB2UTCHK)
-START DATABASE(DSNDB04) SPACENAM[RAPTBST2]
-START DATABASE(BMCNGTC1) SPACENAM(RTSCRIT]
END
/*
//SYSIN DD *
ALTER TABLESPACE DSNDB04." RAPTEST" BUFFERPOOL BP1;
ALTER INDEX RAP."TEST_TABLE_IX" BUFFERPOOL BP2;
ALTER TABLESPACE DSNDB04."DWQAMQTS" BUFFERPOOL BP1;
ALTER INDEX DMR."DISPLIT1" BUFFERPOOL BP2;
ALTER INDEX DMR." DXFAST1" BUFFERPOOL BP2;
ALTER TABLESPACE DSNDB04."DBZUTCHK BUFFERPOOL BP1;
ALTER TABLESPACE DSNDB04."RAPTBST2" BUFFERPOOL BP1;
ALTER TABLESPACE BMCNGTC 1."RTSCRIT BUFFERPOOL BP8KZ;
```

In additional example implementations, real-time data collection and archival may include collecting and storing all data elements required to generate desired KPIs, while preserving associated timestamps. Such saved data may thus be used for both historical and trending purposes.

Either dedicated working sets of page-fixed buffer pools or existing page-fixed buffer pools may be used as shared resources. For example, depending on a received input parameter as shown in FIG. 13, the dedicated or shared mode may be chosen. In a dedicated mode, automated creation of a dedicated working set of buffer pools may be provided. This approach allows users to define maximum pool sizes for dynamically created working buffer pools. This approach may also determine whether large frames (e.g., 1M, 2G sized frames) are available for usage, while determining when such frames should be used. The use of large frames can maximize CPU savings associated with page-fixed buffer pools. Described techniques may be used to monitor 1M and 2G availability on the LPAR 110 and determine when such resources would be best utilized. In a shared mode, existing page-fixed buffer pools are used, while only creating additional dedicated page-fixed buffer pools as needed. Such an approach utilizes available space in the page-fixed buffer pools, while, as in both approaches, objects are moved in and out of the pools based on levels of activity over time.

Objects moved to different buffer pools to optimize the page-fixed resources may be determined. For example, an activity level may be calculated as a KPI for each object defined for use by a particular Db2 database system. This KPI may be calculated at every data collection cycle, to build a history over time. The automated process of data mining and performing the KPI calculations in real-time over numerous cycles also saves the time and effort that would be required if this task were performed manually. The KPI may be used to identify which objects resident in page-fixed buffer pools are low activity. A total size of objects targeted for movement may be calculated, and buffer pool sizes may be adjusted as necessary. Calculations may be performed to determine whether object moves from page-fixed buffer pools will be performed. A list of all objects for removal from the page-fixed buffer pool(s) may be generated.

Page-fixed resource availability may be monitored over time. For example, described techniques may be used to track in real-time the amount of free space in a buffer pool being used as a dedicated or shared page-fixed resource, and/or track in real-time the amount of physical storage available on the LPAR 110.

Long-term analysis of object activity may be performed, and needed configuration changes may be predicted. For example, a history of the peak activity periods of buffer pools may be maintained. A history of objects with the highest I/O producing potential over time and the most active windows of time for each object may also be maintained. Configuration-change directives that can be executed automatically based on the peak historical data, which will result in predicted inactive objects being removed from page-fixed buffer pools and predicted active objects being moved in, may be generated. Such approaches allow for manual mode execution of the configuration-change directive if desired. The configuration-change directive may be archived, and an undo directive to reverse all changes may also be produced and archived. A report detailing the buffer pool of origin for each object, and its target pool, may be generated.

Objects in virtual buffer pools of similar performance profiles may be organized as they are moved out of page-fixed buffer pools due to low activity. This approach may be enabled as a second phase of optimization. For example, a running performance profile for each object may be maintained. The virtual buffer pool best matching each object's performance profile may be found, and the objects may be moved to their respective virtual pools. If such two-phase optimization has not been enabled, objects may be returned to their virtual buffer pools of origin.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, a server, a mainframe computer, multiple computers, or other kind(s) of digital computer(s). A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:
   monitor a main memory of the at least one computing device to determine available main memory for a fixed buffer pool storing a first set of data objects accessible by an application;
   monitor a virtual buffer pool stored in a secondary memory of the at least one computing device and storing a second set of data objects accessible by the application;
   generate object performance profiles that include an object performance profile for each data object of the second set of data objects;
   determine a transfer trigger for selecting a candidate transfer object from the second set of data objects for transfer to the main memory, based on the object performance profiles; and
   transfer the candidate transfer object from the secondary memory to the fixed buffer pool to be included in the first set of data objects, in response to the transfer trigger.

2. The computer program product of claim 1, wherein the instructions are further configured to cause the at least one computing device to:
   generate the object performance profiles including an input/output (I/O) intensity of each data object with respect to the application.

3. The computer program product of claim 1, wherein the instructions are further configured to cause the at least one computing device to:
   determine the transfer trigger based on a number of processor cycles of the at least one computing device saved by executing the transfer.

4. The computer program product of claim 1, wherein the instructions are further configured to cause the at least one computing device to:
   generate a virtual buffer pool performance profile for the virtual buffer pool that includes a characterization of access activity of the virtual buffer pool with respect to the application.

5. The computer program product of claim 1, wherein the instructions are further configured to cause the at least one computing device to:
   execute the transfer by replicating the virtual buffer pool in the main memory to provide the fixed buffer pool; and
   transfer the candidate transfer object into the fixed buffer pool to be included in the first set of data objects.

6. The computer program product of claim 1, wherein the instructions are further configured to cause the at least one computing device to:
   execute the transfer by transferring the candidate transfer object into the fixed buffer pool to be included in the first set of data objects.

7. The computer program product of claim 1, wherein the instructions are further configured to cause the at least one computing device to:
   monitor the main memory, following the transfer; and
   execute a second transfer of the candidate transfer object, from the fixed buffer pool to the virtual buffer pool.

8. The computer program product of claim 1, wherein the instructions are further configured to cause the at least one computing device to:
   monitor the main memory, following the transfer; and
   execute a second transfer of the candidate transfer object, from the fixed buffer pool to a second virtual buffer pool in the secondary memory, based on a correspondence of the object performance profile of the candidate transfer object and a virtual buffer pool performance profile of the second virtual buffer pool.

9. The computer program product of claim 1, wherein the instructions are further configured to cause the at least one computing device to:
   execute the transfer including generating at least one directive to implement the transfer; and
   execute the at least one directive.

10. The computer program product of claim 1, wherein the first set of data objects and the second set of data objects include at least one of a database table, an index, a tablespace, or an index space.

11. A computer-implemented method, the method comprising:
    monitoring a main memory of at least one computing device to determine available main memory for a fixed buffer pool storing a first set of data objects accessible by an application;
    monitoring a virtual buffer pool stored in a secondary memory of the at least one computing device and storing a second set of data objects accessible by the application;
    generating object performance profiles that include an object performance profile for each data object of the second set of data objects;
    determining a transfer trigger for selecting a candidate transfer object from the second set of data objects for transfer to the main memory, based on the object performance profiles; and
    transferring the candidate transfer object from the secondary memory to the fixed buffer pool to be included in the first set of data objects, in response to the transfer trigger.

12. The method of claim 11, comprising:
    generating the object performance profiles including an input/output (I/O) intensity of each data object with respect to the application.

13. The method of claim 11, comprising:
determining the transfer trigger based on a number of processor cycles of the at least one computing device saved by executing the transfer.

14. The method of claim 11, comprising:
executing the transfer by replicating the virtual buffer pool in the main memory to obtain provide the fixed buffer pool; and
transferring the candidate transfer object into the fixed buffer pool as one of the first set of data objects.

15. The method of claim 11, comprising:
executing the transfer by transferring the candidate transfer object into the fixed buffer pool to be included in the first set of data objects.

16. The method of claim 11, comprising:
monitoring the main memory, following the transfer; and
executing a second transfer of the candidate transfer object, from the fixed buffer pool to the virtual buffer pool.

17. The method of claim 11, comprising:
monitoring the main memory, following the transfer; and
executing a second transfer of the candidate transfer object, from the fixed buffer pool to a second virtual buffer pool in the secondary memory, based on a correspondence of the object performance profile of the candidate transfer object and a virtual buffer pool performance profile of the second virtual buffer pool.

18. A system comprising:
at least one memory including instructions; and
at least one processor that is operably coupled to the at least one memory and that is arranged and configured to execute instructions that, when executed, cause the at least one processor to monitor a main memory of the system to determine available main memory for a fixed buffer pool storing a first set of data objects accessible by an application;
monitor a virtual buffer pool stored in a secondary memory of the system and storing a second set of data objects accessible by the application;
generate object performance profiles that include an object performance profile for each data object of the second set of data objects;
determine a transfer trigger for selecting a candidate transfer object from the second set of data objects for transfer to the main memory, based on the object performance profiles; and
transfer the candidate transfer object from the secondary memory to the fixed buffer pool to be included in the first set of data objects, in response to the transfer trigger.

19. The system of claim 18, wherein the instructions are further configured to cause the at least one processor to:
execute the transfer by replicating the virtual buffer pool in the main memory to provide the fixed buffer pool; and
transfer the candidate transfer object into the fixed buffer pool to be included in the first set of data objects.

20. The system of claim 18, wherein the instructions are further configured to cause the at least one processor to:
execute the transfer by transferring the candidate transfer object into the fixed buffer pool to be included in the first set of data objects.

\* \* \* \* \*

UNITED STATES PATENT AND TRADEMARK OFFICE
CERTIFICATE OF CORRECTION

| | | |
|---|---|---|
| PATENT NO. | : 12,405,747 B2 | Page 1 of 1 |
| APPLICATION NO. | : 18/171104 | |
| DATED | : September 2, 2025 | |
| INVENTOR(S) | : Roach | |

It is certified that error appears in the above-identified patent and that said Letters Patent is hereby corrected as shown below:

In the Claims

In Column 23, Claim 14, Line 7, delete "obtain provide" and insert -- provide --, therefor.

Signed and Sealed this
Twenty-fifth Day of November, 2025

John A. Squires
*Director of the United States Patent and Trademark Office*